Sept. 16, 1952  J. WINSON  2,610,574
COMBINATION JUICE EXTRACTING MACHINE
Filed June 16, 1947
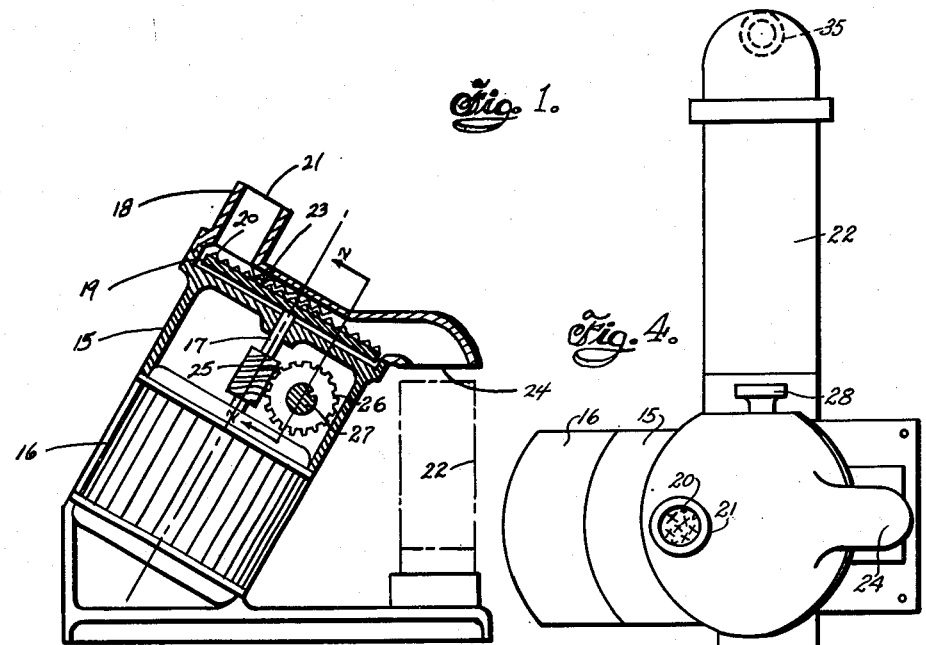
Fig. 1.
Fig. 4.
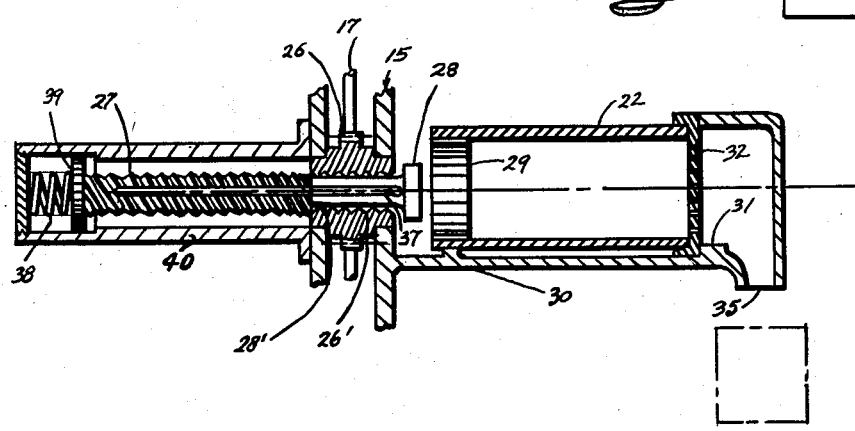
Fig. 2.
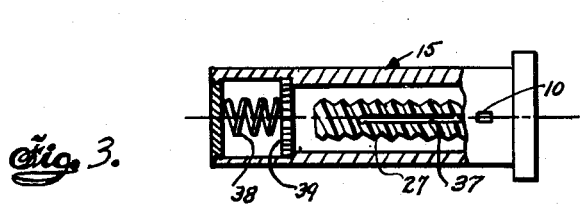
Fig. 3.
JONATHAN WINSON
INVENTOR.
BY
ATTORNEY Patented Sept. 16, 1952

2,610,574

UNITED STATES PATENT OFFICE 2,610,574

COMBINATION JUICE EXTRACTING MACHINE

Jonathan Winson, New York, N. Y.

Application June 16, 1947, Serial No. 754,818

1 Claim. (Cl. 100—96)

This invention relates to a mechanism whose functions are particularly adaptable for a combination fruit and vegetable comminuting and juice extracting machine, by means of which, as a particular embodiment, this invention will here be disclosed. More generally, this invention concerns itself with a mechanism including a slidably mounted member having a rest position, and a revolving shaft, where, when said shaft rotates in one direction, said member will move in one direction away from its rest position. When the shaft rotates in the opposite direction, said member will be returned to its rest position and remain there during continuance of rotation of the shaft in such reverse direction. Also, when said member is in its rest position, and the shaft is rotated in such reverse direction, said member will not move.

An object of this invention is to provide a novel and improved mechanism of the character described in a machine for the uses mentioned, where rotation of the shaft operates a fruit and vegetable comminutor and movement of the slidable member operates a juice extractor means.

Another object of the present invention is to provide a novel and improved machine for comminuting fruits and vegetables by a cutting, shredding or grating means or the like, and then by a simple manipulation, to actuate a press device for extracting the juice from the triturated material.

Another object hereof is to provide a novel and improved mechanism and its embodiment in the machine mentioned, which is simple to operate, reasonably cheap in construction and efficient in carrying out the purposes for which it is designed.

Other objects, purposes and advantages will become apparent as this disclosure proceeds.

In the accompanying drawings forming part of this specification, similar characters of reference indicate corresponding parts in all the views.

Fig. 1 is a central, sectional side view of a combination comminuting and juice extracting machine embodying the teachings of this invention.

Fig. 2 is a section taken at lines 2—2 in Fig. 1, which is a fragmentary, sectional front view of said machine. Here, the slidable member of the mechanism mentioned, which member operates the juice extraction press, is shown in normal rest position, ready to commence piston movement.

Fig. 3 diagrammatically shows a portion of Fig. 2, with the slidable member or piston ram shown moved from its normal rest position, whereby the piston has been moved into the press cylinder.

Fig. 4 is a top plan view of Fig. 1.

In the drawings, the embodiment illustrated, comprises a frame designated generally by the numeral 15, which carries an electric motor 16, the direction of rotation of whose shaft 17, can be reversed by electro-switch means. This shaft 17, extends within a housing 18, wherein it carries a disc cutter 19, having teeth 20, on a face thereof, for comminuting action on fruits and vegetables fed into housing 18, through a hopper 21. The resulting mash is collected in a receptacle, here shown as 22 generally. The housing 18 may be provided with teeth 23, to co-operate with teeth 20, for finer cutting action. The mash leaves the housing 18, through a delivery spout 24.

The motor shaft 17 also carries a worm gear 25, which is in engagement with a gear wheel or nut 26, journalled in frame 15. Said wheel 26 is interiorly threaded, adapted for engagement with the screw portion 27, of a ram rod 28, positioned through such threaded bore in said wheel. Said ram rod 28 has a portion 28', which is slidable through the threaded bore of the wheel 26, and extends from the frame 15, for action against a piston 29, slidably fitted in receptacle 22; said frame having a suitable bed or platform portion 30, on which receptacle 22 may be rested against a stop component 31. The numeral 32 indicates a perforated cap which is detachably mounted onto either end of a receptacle made by tubular member 22 and its piston 29. The numeral 31 indicates a part of the frame 15, which serves as a stop for receptacle 22, and 35 is a juice delivery spout. The ram rod 28 is maintained against axial rotation by means of a key 10 fixed on the frame and extending into a longitudinal groove 37 along said rod 28. The numeral 38 is a compression coil spring, fixed to the frame, but acted on to be stressed when the ram rod 28 nears the junction of its threaded and unthreaded portions.

It is advisable to have the springs 38 act against a plate or disc 39, which is freely slidable in the end portion of casing 40, which is of enlarged bore.

The manner of use and operation of this machine will now be explained.

During use of the cutter disc 19, the motor shaft 17 is revolving in such direction that screw 27, if in engagement with the threads 26' of the wheel 26, and the ram rod 28 will move towards the left in Fig. 2, until said screw is clear of the threads 26', whereupon said ram rod 28 will be in normal rest position, and spring 38, will be stressed. Cap 32 is off receptacle 22, and the latter is used to collect therein, mash issuing from delivery spout 24.

When the receptacle is filled, cap 32 is mounted on its open end, and the receptacle 22 laid on the rest 30, so that it is up against stop 31, and piston 29 is opposite the head 39 of the ram rod 28. Now the direction of rotation of shaft 17 is reversed. Stressed spring 38 will cause the engagement of screw 27 with threads 26' of the wheel 26. Rotation of said wheel which is now in direction opposite to what it was formerly, will cause the ram rod 28 to move towards the piston 29, and finally contact and push same into the cylinder or tubular member 22, towards the cap 32, causing all juice contained in the mash within member 22, to be squeezed or pressed out. Such juice will issue forth from the spout 35 to be collected in any suitable container for use. A proper marking, not shown, on the ram rod 28, will indicate to the operator to stop or reverse the motor 16. Upon such reversal, ram rod 28 will be caused to move out of the cylinder 22, and will continue on until screw portion 27 is out of engagement with threads 26' of the wheel 26, whereupon said ram rod will cease its movement, although motor 16 will continue with its shaft 17 revolving in such reversed direction. Near the end of the withdrawal of the ram rod 28, the spring 38 will again be stressed, ready to function upon reversal of rotation of the motor shaft 17.

Portion 28' of the ram rod 28, is preferably a smooth rod, of a diameter sufficient to clear the threads of wheel 26. Said wheel may be deemed a nut, adapted for threaded engagement with the screw portion 27 of the ram rod 28, in the particular mode of operation herein set forth.

It is evident that when the embodiment is such that ram rod 28 is positioned upright or at such slant that the action of gravity shall cause it to fall along its longitudinal axis, the spring 38 may be omitted; of course, the screw portion 27 of said ram rod, being uppermost. It is therefore desired that in the definition of the means to accomplish the function of said spring 38, the action of gravity shall be deemed its equivalent and included in such definition.

This invention is capable of numerous forms and various applications without departing from the essential features herein disclosed. It is therefore intended and desired that the particular embodiment illustrated herein be deemed illustrative and not restrictive and that the patent shall cover all patentable novelty herein set forth; reference being had to the following claim rather than to the specific description herein to indicate the scope of this invention.

I claim:

In combination, a frame, a nut having a threaded bore and journalled on the frame whereby it is revolvable about the axis of its threaded bore, a screw adapted for threaded engagement with the nut and positioned in alignment with the bore of the nut, co-operating means on the screw and frame to maintain the screw against axial rotation but permitting longitudinal movement of the screw, means to urge the screw longitudinally towards the nut when the screw and nut are in disengagement, whereby the end of the screw thread nearest the nut is in contact with the end of the threaded bore of the nut, and upon rotation of the nut in one direction, the nut will threadedly engage the screw and move the latter therethrough in one direction, and upon reversal of the direction of rotation of the nut, the screw will move through the nut in the reverse direction until it becomes threadedly disengaged from the nut, the screw assuming a substantially constant position with respect to the frame upon such disengagement regardless of continued rotation of the nut in such reverse direction, means to rotate the nut comprising a driving shaft whose direction of rotation determines the direction of rotation of the nut, said shaft being mounted on the frame, a comminuting means for substances having juice therein which is driven by said shaft, and a juice extracting press comprising a cylinder having a piston slidably positioned therein, the screw upon movement thereof in one direction through the nut, being adapted to move the piston into the cylinder, and means on the frame to maintain the cylinder against movement in the direction of the screw movement.

JONATHAN WINSON.

REFERENCES CITED

The following references are of record in the file of this patent:

UNITED STATES PATENTS

| Number | Name | Date |
| --- | --- | --- |
| 1,312,313 | Dovi | Aug. 5, 1919 |
| 1,416,182 | Farmer | May 16, 1922 |
| 2,154,649 | Wishinsky | Apr. 18, 1939 |
| 2,273,093 | Drachenberg | Feb. 17, 1942 |
| 2,312,402 | Granjon | Mar. 2, 1943 |
| 2,417,564 | Newman | Mar. 18, 1947 |
| 2,472,002 | Clark | May 31, 1949 |
| 2,513,974 | Thomas | July 4, 1950 |